US008246840B1

(12) United States Patent
Blundy et al.

(10) Patent No.: US 8,246,840 B1

(45) Date of Patent: Aug. 21, 2012

(54) METHOD AND APPARATUS FOR CHANGING A DIESEL ENGINE FUEL FILTER

(76) Inventors: George R. Blundy, Walled Lake, MI (US); Ram D. Bedi, Bloomfield Township, MI (US)

(*) Notice: Subject to any disclaimer, the term of this patent is extended or adjusted under 35 U.S.C. 154(b) by 364 days.

(21) Appl. No.: 12/542,563

(22) Filed: Aug. 17, 2009

Related U.S. Application Data

(60) Provisional application No. 61/089,258, filed on Aug. 15, 2008.

(51) Int. Cl.
*B01D 37/00* (2006.01)

(52) U.S. Cl. ............ 210/767; 141/67; 141/69; 184/1.5; 210/137; 210/172.1; 210/232; 210/248

(58) Field of Classification Search .................... 210/86, 210/94, 97, 104, 134, 136, 137, 167.01, 171, 210/172.1–172.4, 232, 234, 248, 249, 767; 184/1.5; 141/65, 67–69
See application file for complete search history.

(56) References Cited

U.S. PATENT DOCUMENTS 2,755,969 A * 7/1956 Rainero .......................... 141/25
3,216,527 A * 11/1965 Lewis ............................ 184/1.5
4,128,140 A * 12/1978 Riches ........................... 184/1.5
4,552,662 A * 11/1985 Webster et al. ............... 210/232
5,246,086 A * 9/1993 Yunick ........................... 184/1.5
5,476,154 A * 12/1995 Sage ............................. 184/1.5
5,779,900 A * 7/1998 Holm et al. ................... 210/411
6,048,454 A * 4/2000 Jenkins ...................... 210/172.1
6,569,320 B1 * 5/2003 Bedi et al. ....................... 210/94
7,967,151 B1 * 6/2011 Bedi et al. .................. 210/416.4

* cited by examiner

*Primary Examiner* — Joseph Drodge
(74) *Attorney, Agent, or Firm* — Young Basile Hanlon & MacFarlane, P.C.

(57) ABSTRACT

A fuel removal device comprising: means for establishing releasable fluid communication with an interior volume of an engine-mounted diesel fuel filter; a first conduit affixed to the releasable communication means for conveying diesel fuel contained in the interior volume of the engine-mounted diesel fuel filter out of the fuel filter; a collection receptacle in fluid communication with the fuel conveying conduit, the collection receptacle having a plurality of walls and located external to the automotive vehicle associated with the engine-mounted diesel fuel filter and at least on pneumatic system controlling the removal of fuel from the diesel fuel filter.

12 Claims, 4 Drawing Sheets

METHOD AND APPARATUS FOR CHANGING A DIESEL ENGINE FUEL FILTER

The present invention is directed to a method and apparatus for changing an engine fuel filter, particularly in diesel engine configurations.

Diesel engine filters must be routinely changed to insure proper function of the associated engine. These devices tend to hold significant quantities of residual fuel.

Removal of diesel engine filters is an opportunity for spillage of the fuel which is contained in the filter housing. This poses a risk of environmental contamination and, can jeopardize worker safety. Thus the filter units to be changed or removed must be handled carefully to minimize these risks. This can add time and complexity to filter change operations and does not completely eliminate the risks outlined and associated with filter change operations. Additionally removal of the fuel with the associated filter wastes fuel that could be otherwise used in engine operations. Recovery of the fuel could provide additional cost savings in engine operation and use.

Heretofore it was understood that in various large diesel engines, the fuel filter could contain several ounces of fuel. Newer fuel filters have been proposed that will contain up to a gallon of diesel fuel or more. The fuel in the filter is, typically mixed with water and/or other contaminating materials. If this fuel material is discarded indiscriminately, it can cause environmental degradation. Even if the material is disposed of in an environmentally friendly manner, the fuel value of this petroleum product is lost or severely compromised. At best, the material is collected for recycle and/or use as a lower-grade petroleum product in filter change operations typically employed. All too often, significant quantities of the fuel contained in a diesel engine fuel filter remain in the filter, creating waste and filter disposal problems. It would be advantageous if this material could be captured in some manner and reused in the fuel system of the associated vehicle. It would also be advantageous if the spent filter could be drained in an efficient manner so that little or no fuel remains in the filter to be discarded.

Heretofore various attempts have been made to address and overcome the problems associated with changing engine fuel filters, including but not limited to, the device and method outlined in U.S. Pat. No. 6,569,320 to Bedi. In U.S. '320, a suitably configured fuel filter mount can be configured with quick connect couplers to releasably communicate with a reservoir for collecting fuel out of a filter, conditioning it and reintroducing it into the fuel filter upon the completion of fuel filter change operations. The device provides filter change capability for engines having limited filter volume but is not configured for vehicles having large volume filter devices.

Due to the typical volume of the diesel fuel filter, the newly positioned replacement filter must be charged with a suitable volume of fuel before starting the engine in order to obtain maximum engine efficiency and fuel usage. Thus fuel filter changes can also necessitate the additional step of charging the fuel filter with a volume of diesel fuel after the filter is in position. It has also been found that in engines with large volume filters, refilling the filter can introduce an air pocket in the fuel supply system that results in sputtering and suboptimal engine performance on engine restart.

Thus it would be desirable to provide a fast and efficient method for removing engine fuel from the filter prior to, or during the filter element change operation and replacing the fuel after replacement of the filter element. It would also be desirable to provide a method and device which would provide for the removal and replacement of the fuel filter element in a self-contained and efficient manner.

SUMMARY

A method for to facilitate change of a large volume diesel fuel filter and a device for achieving the same are disclosed herein. The device comprises means for establishing releasable fluid communication with an interior volume of a vehicle mounted large volume diesel fuel filter; a first conduit affixed to the releasable communication means for conveying diesel fuel contained in the vehicle-mounted diesel fuel filter out of the fuel filter; a collection receptacle in fluid communication with the fuel conveying conduit, the collection receptacle having a plurality of walls and located external to the automotive vehicle associated with the engine-mounted diesel fuel filter and at least one pneumatic device controlling the removal of fuel from the diesel fuel filter.

The method described herein includes the steps of reintroducing sequestered diesel fuel held in a fuel containing receptacle into a diesel fuel filter and associated fuel conveying conduits in an associated vehicle engine, the suggested fuel is removed under vacuum from a spent fuel filter and introduced into a fresh fuel filter under pressure.

DESCRIPTION OF THE DRAWINGS

In order to more fully understand the present invention, the following drawing is presented in which like reference numbers are use throughout the various drawing figures and in which.

DESCRIPTION

The method and device disclosed herein provide a quick and effective system for removing fuel from an associated diesel fuel filter and conduits in fluid connection therewith. Where desired or required, the method achieves reintroduction of sequestered diesel fuel into associated fuel conveyance line(s) conveying diesel fuel to the engine downstream and/or upstream of the fuel filter in a manner that prevents or eliminates entrained air in the fuel conveyance system. The method and/or device includes at least one pneumatic controller.

The device disclosed herein provides an integrated, self-contained means for at least one of the removal, collection and/or return of diesel fuel to an engine fuel filter during filter change operations. Because the fuel removal and return operations are relatively easy and self-contained, it is envisioned that the device will facilitate and streamline fuel filter change procedures. This can result in cost and time savings per filter change operation.

Various systems for fuel removal and replacement have been proposed and employed. Among these is a device and method presented by the present inventors as U.S. Pat. No. 6,569,320 the content of that disclosure are incorporated by reference herein. It has been found, quite unexpectedly that the pressure/pneumatic system disclosed herein can achieve rapid and efficient removal of large volume diesel filters over that disclosed in methods and devices such as previously described and disclosed by the present inventors.

Broadly construed, the device disclosed herein includes a housing configured to be positioned external to the associated automotive vehicle, a diesel fuel collection receptacle associated with the housing, a first conduit in fluid communication with the diesel fuel collection reservoir having means for establishing releasable fluid communication with the interior volume of a vehicle-mounted large volume diesel fuel filter. The device also includes means for utilizing pressurized gas in at least one of the diesel fuel removal from the onboard filter unit step, the diesel fuel filter purge step, and the diesel fuel reintroduction step. Typically, the device includes at least one pneumatically operable control mechanism.

Figure 1:
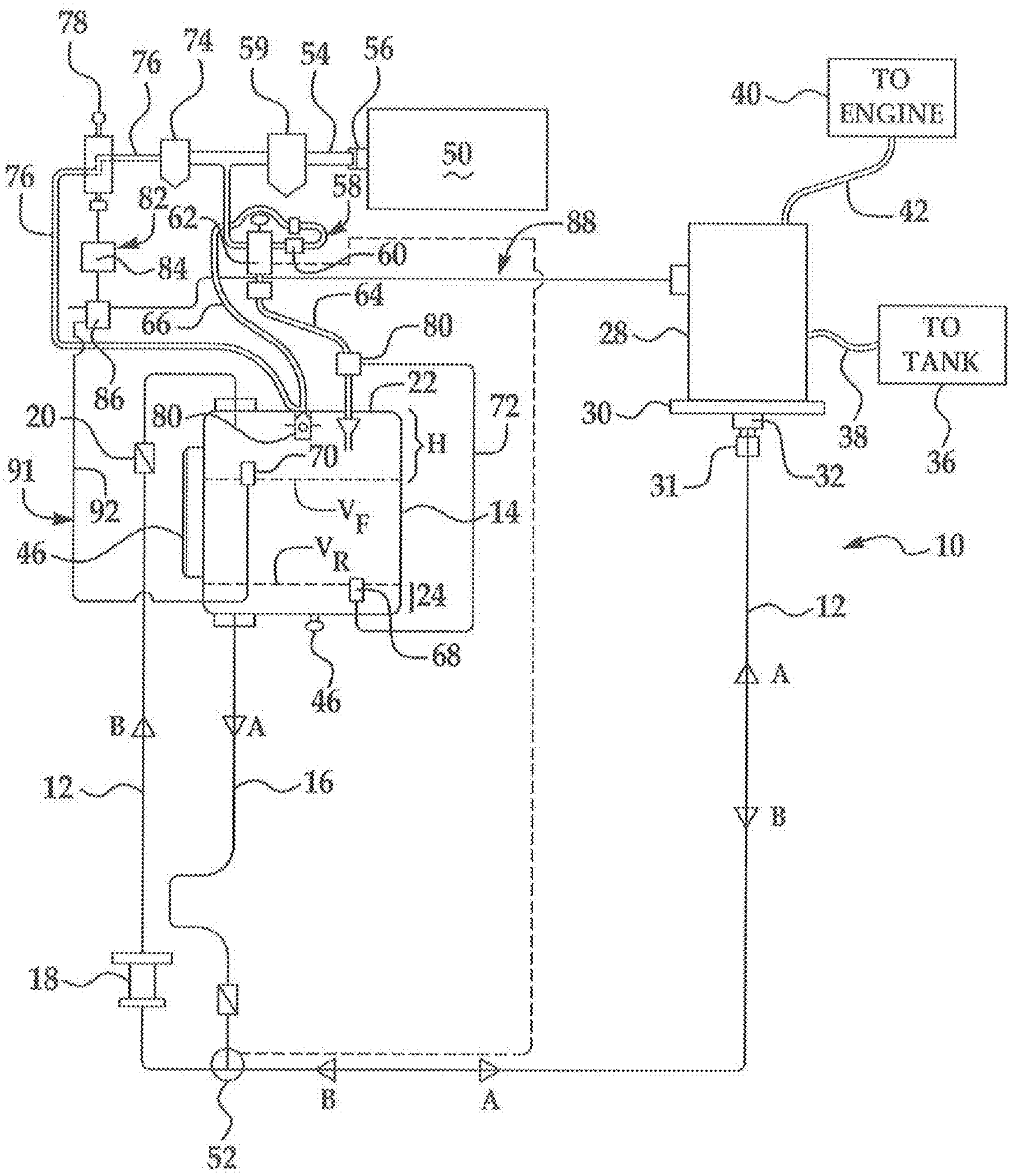
FIG. 1 is a schematic diagram of an embodiment of the device disclosed herein in releasable contact with a diesel engine oil filter.

The device 10 disclosed herein generally includes a fluid circuit and a pressure circuit and is depicted schematically at FIG. 1. The fluid circuit is defined, at least in part by conduit 12, a collection reservoir 14, and a return conduit 16. The conduit 12 can include a filter device 18 as well as suitable check valve devices such as check valve 20 located downstream of the filter 18 and upstream of collection reservoir 14. It is contemplated that the conduit 12 can be in fluid connection with the reservoir through any suitable means including but not limited to various fluid tight couplers and connectors (not shown.)

In the embodiment depicted in the various drawing figures, the conduit 12 is connected with a top or upwardly oriented face 22 of the reservoir 14. When coupled in this manner, it is contemplated that fluid entering the reservoir can fall via gravity to the lower regions 24 of the reservoir 14. It is considered within the broad purview of this disclosure that the connection between the conduit 12 and reservoir 14 can be located at other regions that facilitate conveyance of fuel from the engine fuel filter to the reservoir 14.

The device is configured for return or replacement of at least a portion of the removed diesel fuel. In the embodiment depicted in FIG. 1, it is contemplated that at least a portion of the conduit 12 can be configured for bi-directional sequential fluid flow as indicated by the arrows A, B located on conduit line 12 with arrow A indicating fluid flow to the engine fuel filter 28 and arrow B indicating fluid flow from the engine fuel filter 28. Where so configured, conduit 12 will have suitable valve flow controllers to permit fluid flow in the desired direction. The flow controllers can be controlled and operated as desired or required, for example, by suitable pneumatic control systems. While bi=directional systems are depicted, it is also considered within the purview of this invention to employ dedicated single-direction conduits if desired or required.

The diesel fuel filter 28 to which the device 10 is releasably connected is typically considered a “high volume diesel fuel filter.” As used herein, the term “high volume diesel fuel filter” is defined as a filter having an internal volume greater than two quarts. The maximum internal volume can be any suitable volume with maximum volumes of 1 to 1.5 gallons being typical in certain applications.

The device 10 disclosed is configured to effectively replace diesel fuel in a high volume diesel fuel filter. It is also contemplated that the device can be employed successfully with various lower volume diesel fuel filters in various applications.

In its broadest sense, a diesel engine fuel filter 28 is mounted along a fuel conveyance line on a suitable boss, bracket, or mounting assembly indicated as mounting assembly 30 in FIG. 1. The boss bracket or mounting assembly can be configured with means for achieving removable fluid connection between the device 10 and the fuel filter 28. In the embodiment depicted in FIG. 1, the coupling means are configured in the mounting assembly. Where desired or required, coupling means can be configured as a suitable portion of a quick connect assembly. It is contemplated that coupling means are a suitable portion of a quick connect coupling member such as coupling member 32. The coupling member 32 can be disposed adjacent and/or in fluid communication with the fuel filter 28. Thus the coupling member 32 may be placed in a preexisting drain located proximate to the lowest end of the mounting assembly 30 and can provide fluid egress for a fluid stream from the interior of the fuel filter 28. Alternately, an additional drain opening can be produced in the mounting boss assembly (not shown).

The coupling member 32 establishes fluid access to the interior of the fuel filter as well as to associated regions in the fuel delivery circuit of the associated vehicle. Such regions include, but need not be limited to, the onboard fuel tank 36 via suitable fuel conveyance lines (designated as reference number 38) as well as the vehicle engine 40 via suitable fuel delivery lines (designated as reference number 42). In the embodiment depicted in the drawing figures, coupling member 31 is configured to matingly engage with coupling member 32 of a suitable quick connect coupling device. Coupling member 31 is located on the end of conduit 12.

Figure 2:
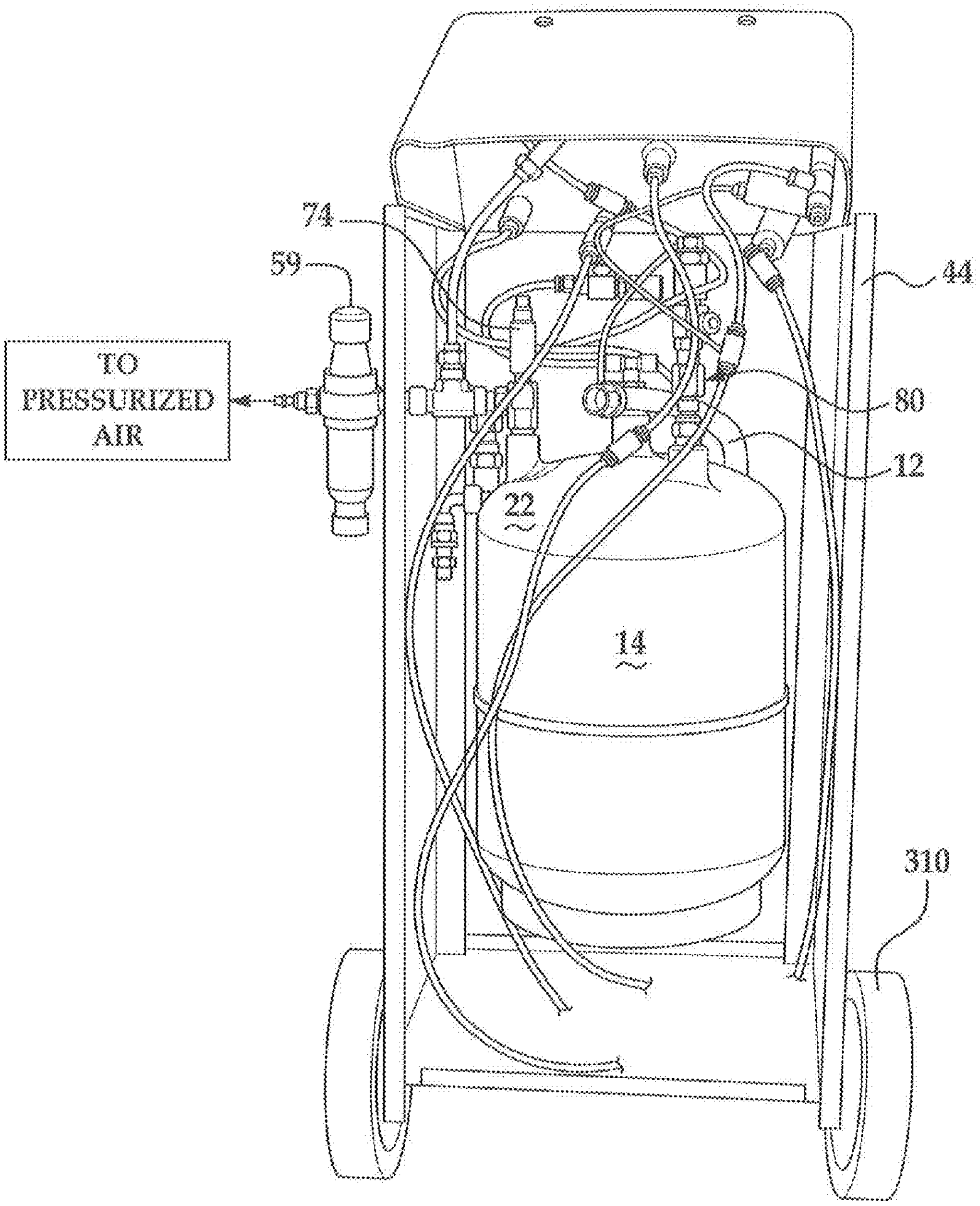
FIG. 2 is a rear view of the an embodiment of the device disclosed herein.
Figure 3:
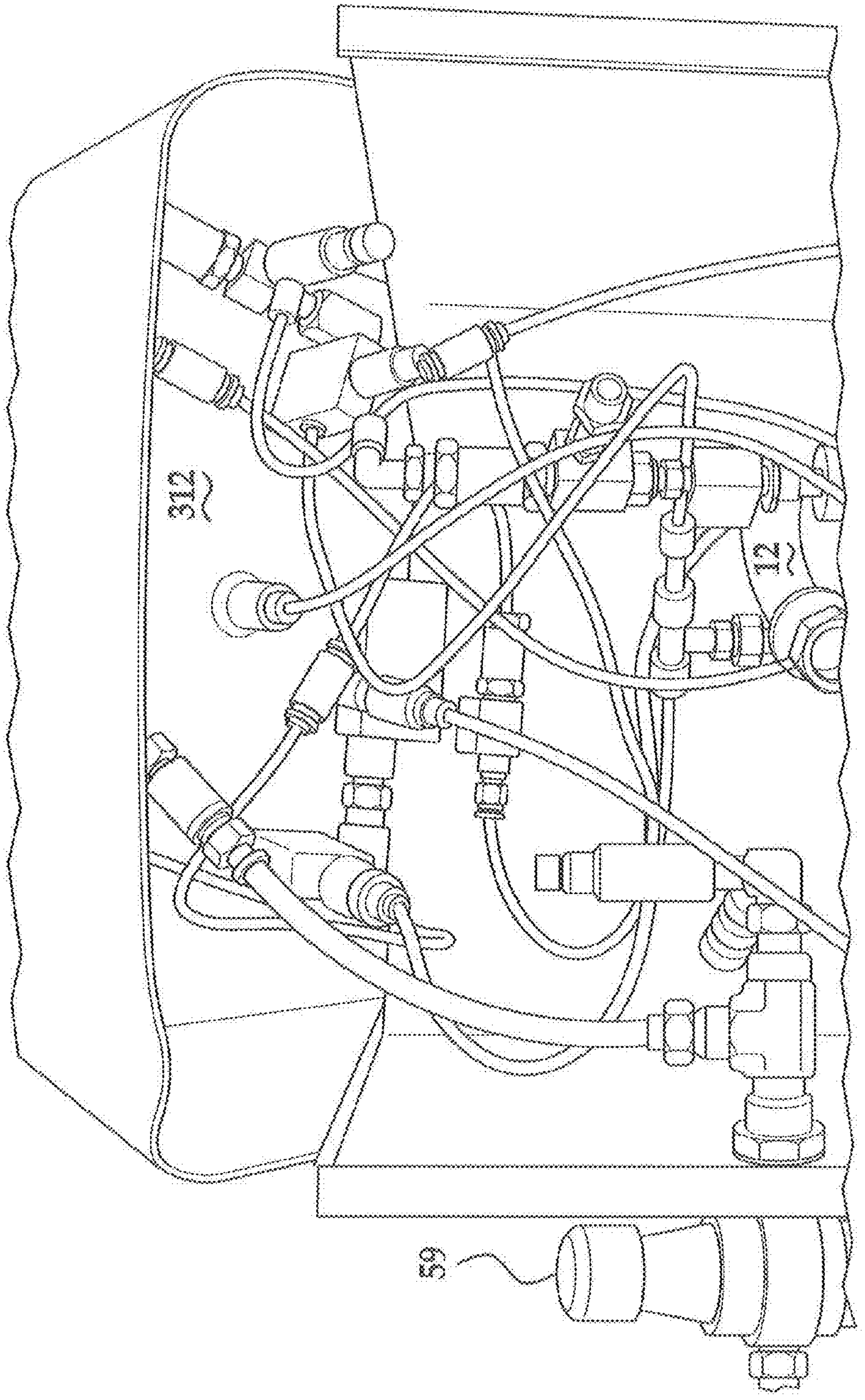
FIG. 3 is a detail view of an embodiment of a pneumatic device as disclosed herein.
Figure 4:
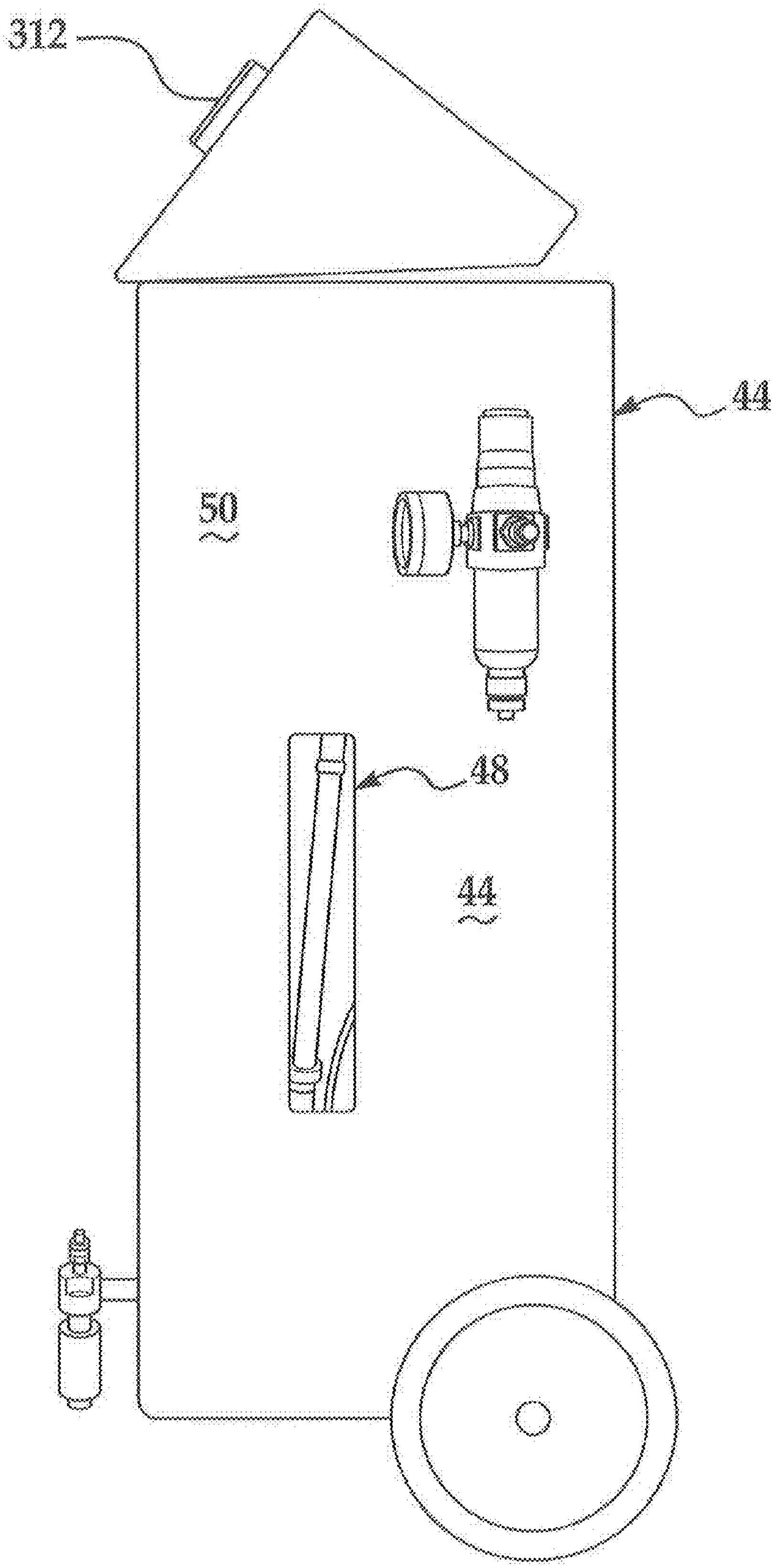
FIG. 4 is a side view of an embodiment of the device disclosed herein.

The externally positionable diesel fuel removal device 10 as disclosed herein can include means for drawing fuel from the filter 28 through the hose 12 into an external holding reservoir or receptacle 14 that is contained in a suitable housing such as housing 44 (see FIG. 2). In the embodiment depicted in FIGS. 1 and 2, the fuel drawing means is a device or apparatus capable of producing a sustained vacuum pressure in the interior of the reservoir 14 of greater than 50 psi. In the embodiment depicted in the drawing figures, the vacuum pressure generating apparatus is connected to a source of pressurized air 50 found external to the device 10. Nonlimiting examples of such sources include shop air pressure line, pressure generators or the like that can be utilized in any suitable manner such as the manner that will be described in greater detail subsequently.

The reservoir or receptacle 14 can include means for permitting visual assessment of the removed fuel such as sight glass 46. Such a device can permit the operator to ascertain the condition of fuel removed from the engine fuel filter as well as determining the amount of fuel removed. As depicted in the drawing figures, sight glass 46 can be mounted to correspond to a suitable visual access aperture 48 defined in a side face 50 of housing 44.

The receptacle 14 can have any suitable construction capable of permitting and sustaining the vacuum pressure desired or required. Where desired or required, the receptacle 14 can include a suitable drain 46 located in the lower oriented region 24 to facilitate removal of material such as sediment and water as required or desired that may accumulate in the receptacle 14.

The receptacle 14 will be configured to have a suitable internal volume to contain the volume of diesel fuel removed from the connected diesel filter together with a volume of diesel fuel removed from fuel conveyance lines such as lines 38 and 42 during filter change operations. In various embodiments such as the one depicted in the drawing figures, it is contemplated that the interior volume will also be sufficient to contain a volume of diesel fuel in addition to the amount removed from the associated diesel fuel filter and associated lines. The internal volume of the receptacle 14 can be sufficient to include a residual volume amount, a filled volume amount, and a filled volume headspace. Residual volume is designated in FIG. 1 as $V_R$ filled volume as $V_F$, and head space as H In order to minimize the accumulation of water and sediment in the receptacle 14, the device 10 can also include at least one suitable filter 18 configured to remove at least a portion of the entrained water and sediment present in fuel drawn from the fuel filter 28. In the embodiment depicted in the drawing figures, it is contemplated that the conduit-mounted filter 18 can have any suitable filtration media such as filtration media having a sieve size of approximately 30 microns or smaller. Where desired or required, it is contemplated that various filter media can be provided as various sizes to trap or entrain various material. As a non-limiting example, filtration media capable of trapping and or entraining water particles as small as 100 microns may be employed in particular instances. One non-limiting example of suitable filtration media includes 40 mesh screen.

Where desired or required, the filter 18 or components thereof can be removable or replaceable. It is also contemplated that the filter device can be equipped with suitable means (not shown) for indicating filter replacement is required. Such indicator means can include, but need not be limited to, visual, electronic or non electronic signals triggered by events such as a change in condition of the filtration media or the volume of contaminant accumulated in the filter 18. It is also contemplated that the filter 18 can be equipped with suitable remote signaling devices that will prevent operation of the device 10 if the filter 18 requires service or refurbishment. Filter 18 can also be equipped with suitable self regeneration devices as desired or required.

In various embodiments, it is contemplated that the filter 18 can contain suitable filtration media capable of removing contaminants from hydrocarbon materials such as diesel fuel. Such filtration media may comprise one or several different materials as required to accomplish suitable fuel filtration. It is anticipated that such filtration media will be capable of removing contaminants such as by-products of incomplete combustion of the diesel fuel as well as contaminants derived from the engine itself. Such contaminants include, but are not limited to, metallic or metal-base materials which result from the engine operation and parts contained therein. Other contaminants may include components derived from engine lubricants, seals and gaskets, and the like. Additionally, the filtration media contained in the associated filter unit 48 can be one which is capable of removing or sequestering various contaminants derived from the external environment such as road dirt particles and the like. Filtration media capable of such functions are known to those skilled in the art.

The filtration media employed in associated filter 18 may be of a type which is removable from the associated filter unit on a periodic basis when the media becomes saturated or unable to provide suitable filtration function. Alternately, it is considered within the purview of this invention that the entire filter unit with filtration media contained therein will be removable from device 10 to permit replacement with a fresh filter unit 10.

Thus, it is contemplated that diesel fuel contained in the receptacle 14 will be essentially clean filter diesel fuel. Where necessary, it is contemplated that the receptacle can include suitable access ports such as drain 46 to permit external access to the fuel contained therein.

The device 10 includes means for exerting a vacuum on the fluid fuel in the fuel filter 18 to draw fluid from the fuel filter 28 and associated conduits through a fluid conveying line such as line 12.

In order to draw fluid from the engine fuel filter 28, vacuum pressure is exerted on receptacle 14. Vacuum pressure in receptacle 14 is translated through hose 12 and coupling members 30, 32 to effect removal of the fluid contained in the fuel filter 28. Fuel is drawn through hose 12 in the direction of arrow B, though filter 18 past check valve 20 to the interior of receptacle 14 where it can be held while suitable fuel filter change operations are performed.

Where desired or required, it is contemplated that the line 12 may include various check valves, routing valves and the like. Where necessary it is contemplated that movement or activation of suitable valves can be controlled by suitable mechanisms, with pneumatic actuators and control systems being employed in suitable embodiments. One nonlimiting example of such a controlled valve is valve 52, which is pneumatically coupled to trigger 62 indicated by broken line.

During fuel evacuation operations, valve 52 can be held in a location that permits fluid flow through conduit 12. During fuel return operations, the valve 52 can be switched to direct fuel from return line 16 into line 12 toward filter 28.

Upon completion of filter change operations, the fuel contained in the receptacle 14 can be reintroduced to the replaced fuel filter as by repressurization of the receptacle 14. At least apportion of the fuel contained in the receptacle 14 can be conveyed back to the replacement fuel filter through suitable conveyance hoses. In the embodiment depicted in FIG. 1, fuel is returned though fuel return line 16 to hose 12 in the direction of fluid flow arrow A. In the embodiment depicted in FIG. 1, it is contemplated that the device 10 can include at least one directional valve such as directional valve 52 to divert fluid travel as desired or required. The valve can be of any suitable configuration and can be moved between at least a first and a second orientation in any suitable such as the operation to be described subsequently.

During fuel evacuation, procedures, suitable vacuum pressure can be exerted on the receptacle 14 to draw diesel fuel from the diesel filter, through line 12 into the receptacle 14. When reintroduction is required, the receptacle 14 can be pressurized to a level sufficient to convey fuel into the fuel filter and associated fuel conveyance lines of the vehicle.

In the embodiment depicted in the drawing figures, the device is operated pneumatically utilizing a suitable source of pressurized air 50. Where desired or required, the source of pressurized air can be derived from a suitable pump, source of bottled gas or other on board device. It is contemplated that the device 10 can be configured to be removably coupled to an external source of pressurized gas such as a suitable shop air line or the like designated in FIG. 1 as reference numeral 50.

Suitable sources of pressurized gas will be those that can convey any suitable gaseous mixture including, but not limited to, conventional shop air, nitrogen and the like at pressures up to at least 125 psi. It is to be understood that in many situations shop gas is delivered at pressures greater than 125 psi. Elevated pressures can be utilized with delivery pressures up to and above 160 psi being contemplated in various situations.

The device 10 can include suitable coupling means to connect the device 10 to the source of pressurized gas 50. Where desired or required, the device 10 can include at least one pneumatic line 54 to convey the pressurized air to desired location(s) in the device 10 suitable regulators and devices such as regulator 59 to reduce and maintain the introduced shop air to a suitable operational level. In the embodiment depicted, it is contemplated that the external source will be configured to deliver gas at a suitable operational pressure, for example, 125 psi. This pressure is considered exemplary for various embodiments. It is considered within the purview of this disclosure to employ other initial operational pressures as desired or required. The device 10 can include suitable coupling members and pressure regulating devices to maintain a suitable operational pressure.

Pneumatic line 52 can be equipped with suitable couplers as desired or required to connect the pneumatic line 54 to the external gas source 50 such as couplers 56, as well as pressure regulator 59.

In the embodiment as depicted, pressurized gas at 125 psi can be delivered to a suitable vacuum generation mechanism 58. In the embodiment depicted, the vacuum generator mechanism includes a suitable venture device 60 coupled to a suitable stop valve 62 positioned to draw a vacuum on lines 64 and 66 coupled in pneumatic contact with the receptacle 14. Lines 64 and 66 can be coupled to the receptacle 14 in any suitable manner. In the embodiment depicted, lines 64 and 66 are connected at or near the upper face of the receptacle 14 at a location in the head space H above the maximum fuel level in the receptacle.

It is contemplated that the introduced pressurized gas can be utilized to draw a vacuum on the receptacle 14 to draw fluid from the connected fuel filter 28 into receptacle 14. The receptacle 14 can be configured to be empty or essentially empty as required or desired. In the embodiment as depicted, it is contemplated that the receptacle will be configured to contain a residual volume of fluid fuel material 24 when the receptacle is in the non-filled state. The retained amount will generally be a volume sufficient to ensure introduction of a sufficient quantity of replacement fuel at a sufficient pressure during the fuel replacement phase of operations. In certain embodiments, it is contemplated that this residual amount will be approximately 1 to 4 quarts. The residual amount will be fresh diesel fuel that can be introduced into the receptacle by any suitable means.

The vacuum pressure that is exerted is that sufficient to remove fuel resident in the vehicle fuel filter 28 and any associated lengths of the fuel delivery line 42 and fuel conveyance line 38. In various situations, it is contemplated that vacuum pressures up to 125 psi can be employed.

In order to achieve and maintain suitable fluid levels in the receptacle 14 during removal and replacement operations, the receptacle can include appropriate fluid level controls such as liquid level sensors or floats 68 and 70. It is contemplated that the device 10 will include suitable level controllers and regulators to limit maximum volume contained in the receptacle 14 and limit maximum volume delivered from the receptacle 14 into the appropriate fuel filter 28 and associated engine conduits. In the embodiment depicted in FIG. 1, float 68 is a lower level regulator in pneumatic contact with line 64 via conduit 72. When fluid levels are at or below the level defined by exceed the maximum level of float 68, vacuum in the receptacle 14, movement of or action upon float valve 88 can trigger a suitable message to maintain suitable vacuum levels in the receptacle 14. When the fluid level reaches the lower set level, $V_2$ defined by float 68, vacuum pressure exerted in line 72 is discontinued. This discontinuity is detected at feedback mechanism 74 and the vacuum exertion operations are discontinued. In the embodiments depicted, it is contemplated that the feedback mechanism 74 can be configured as any suitable configuration of pneumatic control mechanisms.

In order to draw fluid from the fuel filter 28 and associated conduits 42 and 38, it is contemplated that a suitable operation sequence can be triggered by a suitable manually operable switch. In the pneumatic system depicted in the embodiment in FIG. 1, a manually triggered switch can be connected to a suitable valve to initiate a fluid removal cycle in which fluid is drawn under vacuum into the receptacle triggering the initiation of the cycle. As depicted in FIG. 1, a second pressure regulator 74 is positioned in line 54 downstream of regulator 59. The second pressure regulator 74 is configured to achieve a pressure reduction from 125 psi to a suitable lower pressure level such as 75 psi in line 76 immediately downstream.

Activation of trigger mechanism 78 opens a line 76 for the delivery of pressurized gas through line 76 at a suitable operating pressure (for example 75 psi) to module 80 located proximate to overflow valve 80 associated with receptacle 14.

Trigger 78 is also connected to a suitable pneumatic receptacle monitoring loop 82 in pneumatic communication with fluid high level monitor or float 70 located in receptacle 14. In the embodiment as depicted pneumatic monitoring loop 82 is configured to include a suitable down pressure regulator 84 configured to step line pressure down from a level of approximately 75 psi to a suitable lower pressure level such as, for example, 25 psi, suitable variously for operating associated pneumatic controls. It is contemplated that the lower pressure gas stream is delivered to a suitable routing valve 86 to deliver pressurized air to the fuel filter 28 upon completion of the fuel removal process. The pressure level of the air so delivered is generally at a level sufficient to force any fluid remaining in the fuel filter 28 into the line 12 and receptacle 14.

Pressurized gas can be conveyed to the fuel filter 28 in any suitable manner. In the embodiment depicted, the pressurized gas can be conveyed through a suitable line such as line 88. Line 88 can be connected to the fuel filter housing of the associated filter 28 at any suitable location. Generally, suitable locations can be positions somewhat distal to the connector 32. Suitable connections are those that permit and facilitate pressurized communication and can be accomplished by quick connectors and the like.

The pneumatic system as generally disclosed herein is configured to permit the sequential introduction a quantity of purge gas during and/or immediately after evacuation of the fuel from the fuel filter 28. The duration of purge activities can be controlled by the activation and deactivation of circuit 91 triggered by movement of float 70. Float 70 is located in the interior of receptacle 14 and can be calibrated to a level approximately equal to the contents of the fuel filter 28 plus an additional volume derived for conduits 38 and 42. Float 70 is associated with a closable valve connected to vacuum line 92 of circuit. While open, vacuum line 92 experiences a negative pressure due to the action of vacuum line 64. Once closed the cessation of vacuum pressure in line 90 triggers pneumatic switch 86 resulting in pressurization of line 88. and delivery of positive pressure to filter 28. After a suitable pressurization interval the action of pressurization can be discontinued either though pneumatic action or through a manual or time dependant action. The emptied fuel filter 28 can removed from engagement with the associated vehicle and replaced with a new or reconditioned filter as desired or required.

It is contemplated that the fluid removal operations will yield a spent fuel filter 28 that is essentially free of diesel fuel. As used herein, the term "essentially free of diesel fuel" is taken to mean a spent fuel filter having little or no contained diesel fuel that would be able to be spilled during subsequent operations leading to the removal and disposal of the spent filter. The filter components may contain small amounts of residual fuel and must be disposed of in a suitable manner consistent with accepted environmental standards. It is contemplated that at least 75% of the diesel fuel contained in the filter can be removed and retained. In many applications, this volume is greater than 90%, with quantities as high as 97% being feasible.

In filter change operations, it is envisioned that the spent fuel filter can be replaced by a suitable fresh filter upon completion of the fuel evacuation and spent filter removal. During filter change operations, it is contemplated that the device 10 can remain connected to the vehicle in the manner previously described. During filter change operations, it is contemplated that the device 10 can remain connected to the vehicle in the manner previously described. During filter change operations, it is contemplated that the device 10 can be in a suitable standby mode in which fuel is retained in the receptacle in a suitable pressure neutral state.

As indicated previously, in many situations fuel removal includes removal of a volume of fuel resident in engine fuel conveyance lines 38 and 42. The amount of fuel removed from the associated lines 38, 42 is a volume sufficient to minimize or eliminate leakage of fuel during filter change operations.

Upon replacement of the spent fuel filter with a fresh unit, the device 10 can be triggered to return the retained fuel material to the fresh fuel filter and to the associated channels 38 and 462. Fuel return can be achieved by any suitable mans, in the embodiment depicted, in order to initiate fuel return, the trigger 62 can be manually operated to initiate the flow of pressurized gas from the pressurization source 40. Pressurized gas flows through line 54 past regulators 59 and 74 and on through line 76, where it dead heads at device 86 and pressurizes trigger 62. Activation of trigger 62 initiates the delivery of pressurized air goes into the receptacle 14 through line 66 forcing fluid through conduit 16 past routing valve 52 into conduit 12 in the direction of arrow A.

It is contemplated that the diesel fuel will be delivered through connector 32 into the fresh diesel filter 28 and into the channels 38 and 42 to replace material removed during fuel removal operations. The pressurized gas used to deliver the diesel fuel can be at any suitable pressure with a gas pressure of 75 psi being utilized in the embodiment depicted.

It is contemplated that the device 10 can be configured so that the fuel delivered to the fresh filter 28 and associated conveyance lines 38, 42 has a head pressure that gradually increases to 75 psi as the fuel is introduced into the fresh filter 28. Gradual increase in the introduction pressure minimizes the initial volume of gas entrained in the system and facilitates gradual diffusion of the gas remaining in lines 38 and 42 so that at the completion of the fill phase, the volume of entrained air is essentially eliminated. Without being bound to any theory, it is believed that the gradual pressure buildup experienced by the filter 28 and fuel conveyance conduits 38, 42 results in the gradual diffusion of entrained air pockets through various connections and couplings in the powertrain system. This results in an essentially continuous stream of fuel in the fuel delivery and conveyance system upon engine restart.

It is contemplated that the pressurization can continue for an interval sufficient to achieve fuel system priming in the embodiment depicted in the drawing figures, this can be indicated by pressure equilibration brought about by triggering the lower float 68 and pressurization of line 72. Rise in pressure in line 72 can feed back to trigger 62 closing line 66 to pressurized air.

In the embodiment depicted, the pressures equilibrate, the successful removal of the fluid to the fuel filter triggers the action of float 68, opening an associated valve to line 72 and pressurizing the line. Pressurization of the line triggers valve 90. Pressure drop in receptacle 14 closes valves associated with trigger 78 and stops the delivery of pressurized air in the associated circuits.

Once the fuel has been transferred from the device 10 to the fresh filter 28 and associated conduits 38, 42, the system can be decoupled and the vehicle placed into service or prepared for additional maintenance operations as desired or required.

The device disclosed herein can be employed to accomplish filter change operations in diesel engines, particularly diesel engines with large volume filter units. In the filter change method disclosed herein, it is contemplated that diesel fuel collected from the spent fuel filter and at least one engine-mounted fuel conveying conduit and sequestered in the collection reservoir of a device 10 is reintroduced into the associated diesel engine through a fresh diesel fuel filter with at least a portion of the reintroduced fuel entering at least one fuel conveying conduit located on the associated engine under pressure derived from a pressurization source external to the device.

While the invention has been described in connection with what is presently considered to be the most practical and preferred embodiments, it is to be understood that the invention is not limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A diesel fuel containment device comprising:

means for establishing releasable fluid communication with an interior volume of an engine-mounted diesel fuel filter;

a collection receptacle located external to an automotive vehicle associated with the engine-mounted diesel fuel filter;

a first fuel conveying conduit positioned between the communication establishing means and the collection receptacle;

means for establishing pneumatic contact between the diesel fuel containment device and at least one source of pressurized gas external to the diesel fuel containment device;

at least one pneumatically operable control operable during replacement of recycled fuel in the engine-mounted diesel fuel filter wherein the pneumatically operable control and source of pressurized gas are configured to achieve gradually increasing pressurization in the engine-mounted diesel fuel filter relative to the volume of recycled fuel conveyed.

2. The diesel fuel containment device of claim 1 wherein the pneumatically operable control comprises at least one pneumatic conduit connected to the pneumatic contact establishment means and the collection receptacle and at least one control device configured to pressurize the collection receptacle when the collection receptacle contains a volume of fluid derived from an engine-mounted diesel fuel filter.

3. The diesel fuel containment device of claim 2 wherein the control device is pneumatically operable and is configured to open at least one valve positioned in the first conduit establishing communication between the pressurized collection receptacle and the engine-mounted diesel fuel filter.

4. The diesel fuel containment device of claim 2 wherein the engine-mounted diesel fuel filter communicates with at least one fuel conveying conduit in the engine and wherein the control device and source of pressurized gas are configured to introduce fuel into the fuel conveying conduit in the engine.

5. The diesel fuel containment device of claim 2 wherein the at least one pneumatically operable control is operable during removal of fuel from the engine-mounted diesel fuel filter and wherein the diesel fuel containment device further comprises at least one pneumatic device connected to the pneumatic conduit configured to draw a vacuum on the collection receptacle when fuel is present in the engine-mounted diesel fuel filter, the vacuum sufficient to remove fuel from the engine-mounted diesel fuel filter and at least one fuel conveying conduit in the engine to the collection receptacle.

6. The diesel fuel containment device of claim 1 wherein the means for establishing releasable fluid communication with an interior volume of an engine-mounted diesel fuel filter includes at least one quick connect fitting.

7. A method for replacing fuel in a diesel fuel filter of a diesel engine comprising the step of:

introducing diesel fuel collected from the spent fuel filter and at least one engine-mounted fuel conveying conduit and sequestered in the collection reservoir of a diesel fuel containment device external to the engine through a fresh diesel fuel filter with at least a portion of the reintroduced fuel entering at least one fuel conveying conduit located on the associated engine under gradually increasing pressure derived from a pressurization source external to the diesel fuel containment device at an interval subsequent to the connection of the diesel fuel containment device of claim 1 to the diesel engine.

8. The method of claim 7 further comprising the steps of:

establishing releasable fluid communication between the diesel fuel containment device and an interior volume of an engine-mounted diesel fuel filter; and establishing pneumatic contact between the diesel fuel containment device and at least one source of pressurized gas external to the diesel fuel containment device.

9. The method of claim 8 further comprising the step of:

drawing a vacuum on the collection receptacle of the diesel fuel containment device sufficient to remove fuel from the engine-mounted diesel fuel filter and at least one fuel conveying conduit in the engine into the collection receptacle of the diesel fuel containment device.

10. The method of claim 7 wherein the fuel introduction step comprises increasing pressurization in the engine-mounted diesel fuel filter relative to volume of diesel fuel introduced.

11. A diesel fuel containment device comprising:

means for establishing releasable fluid communication with an interior volume of an engine-mounted diesel fuel filter;

a collection receptacle located external to an automotive vehicle associated with the engine-mounted diesel-fuel filter;

a first fuel conveying conduit positioned between the communication establishing means and the collection receptacle, wherein the first conduit includes at least one valve configured to regulate communication between the pressurized receptacle and the engine-mounted diesel fuel filter;

means for establishing pneumatic contact between the diesel fuel containment device and at least one source of pressurized gas external to the diesel fuel containment device;

at least one pneumatically operable control operable during removal of fuel from the engine-mounted diesel fuel filter and replacement of recycled fuel in the engine-mounted diesel fuel filter, wherein the pneumatically operable control includes at least one pneumatic conduit connected to the pneumatic contact establishment means and to the collection receptacle and at least one control device configured to pressurize the collection receptacle when the collection receptacle contains a volume of fluid derived from an engine-mounted diesel fuel filter and wherein the pneumatically operable control and source of pressurized gas are configured to achieve gradually increasing pressurization in the engine-mounted diesel fuel filter relative to the volume of recycled fuel conveyed; and at least one pneumatic device connected to the pneumatic conduit configured to draw a vacuum on the collection receptacle when fuel is present in the engine-mounted diesel fuel filter, the vacuum sufficient to remove fuel from the engine-mounted diesel fuel filter and at least one fuel conveying conduit in the engine to the collection receptacle.

12. The diesel fuel containment device of claim 11 wherein the means for establishing releasable fluid communication with an interior volume of an engine-mounted diesel fuel filter includes at least one quick connect fitting.

* * * * *